United States Patent Office 3,477,978
Patented Nov. 11, 1969

3,477,978
HEAT MOLDABLE POLYCARBONATE COMPOSITION
Fred F. Holub, Scotia, N.Y., John J. Keane, Pittsfield, Mass., and James K. S. Kim, Woonsocket, R.I., assignors to General Electric Company, a corporation of New York
No Drawing. Filed Jan. 4, 1967, Ser. No. 607,170
Int. Cl. C08g *39/10*
U.S. Cl. 260—23.7        3 Claims

ABSTRACT OF THE DISCLOSURE

A composition comprising an aromatic polycarbonate resin, a polymer of an olefin of 2–3 carbon atoms which may be either polyethylene or polypropylene, epoxidized polybutadiene and a metal salt of a carboxylic acid such as zinc stearate. In addition, this invention is also directed to a process for preparing the above composition and to a molded article employing the above composition wherein a mixture of the above materials is fed to an extruder at a temperature of at least 250° C., the extrudate is then transferred to an injection molding machine which is at a temperature of at least 250° C. and then injection molding the article.

---

This invention relates to a heat moldable thermoplastic composition, to a process for preparing the composition and to a process for preparing a molded article therewith.

Heretofore, it has been known to blend polycarbonates with other materials such as polyethylene in an attempt to achieve certain desirable properties of craze resistance, high impact strength, etc. Unfortunately, such blends have been deficient in one or more of the desirable properties wanted such as craze resistance. In addition, such blends exhibit poor weld line or knit strength which is an indication of the incompatibility of the materials. Specifically, Canadian Patent 734,562 discloses a blend of a polycarbonate and a polyethylene wherein the polyethylene reduces the surface coefficient of friction. However, such a blend when used to fabricate molded articles produces a molded article having poor knit line strength and delaminates. Such deficiencies have now been surprisingly overcome.

Therefore, it is an object of this invention to provide a heat moldable thermoplastic composition.

It is another object of this invention to provide a process for preparing the thermoplastic composition of this invention.

Another object of this invention is to prepare a molded article with the heat moldable composition of this invention.

Other objects and advantages of this invention will become apparent from the following detailed description thereof.

Briefly, according to this invention, the foregoing and other objects are attained by exposing to elevated temperatures an aromatic polycarbonate, a polymer of an olefin of 2–3 carbon atoms, an epoxidized polybutadiene and a metal salt of a carboxylic acid. The resulting product or composition is heat moldable. The critical feature of the composition is that both the epoxidized polybutadiene and metal salt of a carboxylic acid must be present in order to achieve a heat moldable composition.

EXAMPLE I 90 parts of an aromatic polycarbonate of 2,2-bis-(4,4'-dihydroxyphenyl propane and phosgene and having an intrinsic viscosity of about 0.58 in dioxane at 30° C., are fed into an extruder with 10 parts of polyethylene. The extruder is operated at a temperature of about 250° C. The extrudate is chopped up into pellets and the pellets are molded into double-gated impact test bar specimens. The double-gated impact bar is employed to determine the compatibility of the resin composition at the line of meeting. This is known as weld line strength. The same composition is fed into each gate simultaneously and where they meet within the mold is called a weld line.

The test bars have an average weld line strength of about 1.1 ft. pounds and the test bars exhibit delamination.

EXAMPLE II

Example I is repeated except that 89 parts of the aromatic polycarbonate, 10 parts of the polyethylene, 1 part of an epoxidized polybutadiene and 0.05 part of zinc stearate are fed into the extruder.

The resulting test bars have an average weld line strength of about 19.6 ft. pounds and the test bars exhibit no delamination.

EXAMPLE III

Example II is repeated except that in addition to the aromatic polycarbonate and polyethylene, only 1 part of an epoxidized polybutadiene is added and no zinc stearate is employed.

The resulting test bars have an average weld line strength of about 1.3 ft. pounds and the test bars exhibit delaminaton.

EXAMPLE IV

Example II is repeated except that in addition to the aromatic polycarbonate and polyethylene, only 0.05 part of zinc stearate is added and no epoxidized polybutadiene is employed.

The resulting test bars have an average weld line strength of about 0.6 ft. pounds and the test bars exhibit delamination.

This invention is directed to a heat moldable thermoplastic composition and to a process for preparing the composition of this invention and to an article so formed therewith. The composition of this invention comprises an aromatic polycarbonate resin of a dihydric phenol and a carbonate precursor, a polymer of an olefin of 2–3 carbon atoms, namely, polyethylene or polypropylene or mixtures thereof, an epoxidized polymerized diene and a metal salt of a carboxylic acid. Preferably, the composition comprises at least 80 weight percent of the polycarbonate resin, 0.1–2.0 weight percent of the epoxidixed aliphatic diene, 0.01–1.0 weight percent of the metal salt of a carboxylic acid and the balance being the polymer of an olefin of 2–3 carbon atoms. The critical feature of the instant invention is that the epoxidized polymerized diene and the metal salt of a carboxylic acid are essential for producing the heat moldable composition of this invention. If either one of these materials is lacking, a poor molded article results as shown by the examples. Delamination of the molded article occurs and weld line strength or knit strength is very poor indicating that the ingredients lack compatibility.

The chemical nature of the heat moldable thermoplastic composition of this invention is not fully understood. The composition may exist solely as a blend or mixture of the component parts. It may also exist as a polymer resulting from a reaction between the component parts. It may further be a graft copolymer of the polycarbonate and the polymer of the olefin. The chemical nature of the composition is not essential to the invention. The critical feature is that all of the components set forth above must be present when they are exposed to elevated temperatures. All that is known is that the resulting system produces a usable composition of a polycarbonate and a polyethylene which components are not normally compatible. For example, if any other materials are employed such as polystyrene or other various polymers, the resulting composition does not exhibit the characteristics as demonstrated in the examples when using polyethylene. In addition, epoxies other than the epoxidized polymerized diene do not give the results as disclosed in Example II.

Any of the metal salts of a carboxylic acid are useful in the practice of this invention. However, particularly useful are the metal salts of mono-carboxylic acids. In place of the zinc stearate employed in Example II with comparable results are sodium stearate, calcium stearate, magnesium stearate, sodium laurate, calcium laurate, zinc laurate, sodium acetate, calcium acetate, sodium benzoate and calcium benzoate. Also useful in the practice of this invention as the metal salts of a carboxylic acid are the ionomers. Ionomers are a class of polymers which combine ionic forces and covalent bonds in their molecular structure. They have ionized carboxyl groups pendant from polymeric chains and metallic ions, such as sodium, potassium, calcium, magnesium and zinc associated with the ionized carboxyl sites. In place of the zinc stearate employed in Example II, an ionomer consisting of the sodium salt of a partially carboxylated polyethylene is employed with equal results.

The epoxidized polymerized diene of this invention is preferably an epoxidized polybutadiene but includes any epoxidized polymerized diene in which the unsaturation and epoxy are in the same molecule. Other materials which are useful are epoxidized polymethyl butadiene and substituted dienes.

The aromatic polycarbonate employed in the practice of this invention is prepared by reacting a dihydric phenol with a carbonate precursor in the presence of an acid acceptor and generally a molecular weight regulator. Any dihydric phenol may be employed in preparing the polycarbonate resin disclosed herein. Preferably, they are mononuclear or polynuclear aromatic compounds containing as functional groups two hydroxyl radicals, each of which is attached directly to a carbon atom of an aromatic nucleus. Examples of some of the dihydric phenols which can be employed in the practice of this invention are bisphenols such as 1,1-bis(4-hydroxyphenyl) methane, 2,2 - bis(4 - hydroxyphenyl) propane, 4,4 - bis(4 - hydroxyphenyl) heptane, etc.; dihydric phenol ethers such as bis(4 - hydroxyphenyl ether, bis(3,5 - dichloro - 4 - hydroxyphenyl) ether, etc.; dihydroxy diphenyls such as p,p' - dihydroxydiphenyl, 3,3' - dichloro - 4,4' - dihydroxydiphenyl, etc.; dihydroxyaryl sulfones such as bis(4-hydroxyphenyl) sulfone, bis(3,5 - dimethyl - 4 - hydroxyphenyl) sulfone, bis(3 - methyl - 5 - ethyl - 4 - hydroxyphenyl) sulfone, etc.; dihydroxy benzenes, resorcinol, hydroquinone; halo- and alkyl-substituted dihydroxy benzenes such as 1,4 - dihydroxy - 2 - chlorobenzene, 1,4-dihydroxy - 2,3 - dichlorobenzene, 1,4 - dihydroxy - 2-methylbenzene, etc.; and dihydroxy diphenyl sulfoxides such as bis(4-hydroxyphenyl) sulfoxide, bis(3,5-dibromo-4-hydroxyphenyl) sulfoxide, etc.

The carbonate precursor employed in the practice of this invention can be either carbonyl halide or a haloformate. The carbonyl halides which can be employed herein are carbonyl bromide, carbonyl chloride, carbonyl fluoride, etc.; or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene is preferred.

The reaction is carried out in the presence of an acid acceptor, which acid acceptor may be either an organic or an inorganic compound. A suitable organic acid acceptor is a tertiary amine and includes such materials as pyridine, triethyl amine, dimethyl aniline, tributyl amine, etc. The inorganic acid acceptor may be one which can either be an hydroxide, a carbonate, a bicarbonate or a phosphate of an alkali or alkaline earth metal.

In addition, the instant invention is directed to a process for preparing the heat moldable thermoplastic composition of this invention. The process comprises exposing to an elevated temperature of at least 250° C. a mixture of an aromatic polycarbonate resin, a polymer of an olefin of 2–3 carbon atoms, an epoxidized polymerized diene and a metal salt of a carboxylic acid. Exposure to an elevated temperature can be by any well known means such as a heated Banbury mixer, heated rolls, an extruder, etc. The important feature is that the mixture must be exposed to these temperatures in order to produce the composition of this invention having the desirable characteristics as disclosed herein. In the case of the extruder, it may require two or more passes through the extruder or it may require higher temperatures in order to achieve the composition. In addition, the extruders that can be employed may be a single screw or a multi-screw extruder. The extrudate from the extruder can be comminuted into pellets or into a powder. Alternatively, the extrudate can be transferred to an injection molding machine wherein the injection molding machine is also at a temperature of at least 250° C. and then injection molding to a molded article.

The advantages of the instant invention are that the heat moldable composition easily lends itself to a molding where at least a double-gated mold is employed. The knit between the materials is excellent so as to produce excellent welding or weld line strength. No delamination of the molded part results.

It will thus be seen that the objects set forth above, among those made apparent from the description, are efficiently attained and since changes may be made in carrying out the above process and in the composition set forth without departing from the scope of this invention, it is intended that all matters contained in the above description shall be interpreted as illustrative and not in a limiting sense.

What is claimed is:
1. A composition comprising at least 80 weight percent of an aromatic polycarbonate resin, 0.1–2.0 weight percent of a material selected from the group consisting of an epoxidized polybutadiene and an epoxidized substituted polybutadiene, 0.01–1.0 weight percent of a metal salt of a monocarboxylic acid and the balance being the polymer of an olefin of 2–3 carbon atoms.
2. The composition of claim 1 wherein the polymer of the olefin is polyethylene.
3. The composition of claim 1 wherein the metal salt of a carboxylic acid is zinc stearate.

References Cited

UNITED STATES PATENTS

| | | | |
|---|---|---|---|
| 3,196,123 | 7/1965 | Wheelock | 260—836 |
| 3,271,358 | 9/1966 | Coran | 260—45.85 |

OTHER REFERENCES

Perry, Chemical Engineers Handbook, 3rd edition, pp. 1185–1186 (1950).

DONALD E. CZAJA, Primary Examiner

D. J. BARRACK, Assistant Examiner

U.S. Cl. X.R.

260—23, 30.4, 31.2, 835, 836, 873